DEMOUNTABLE SUPERSTRUCTURE FOR MOTOR CRANES AND THE LIKE

Filed June 30, 1958 2 Sheets-Sheet 1

INVENTORS
ROY H. ZEILMAN
OSWALD VON MEHREN
BY
Oberlin & Limbach
ATTORNEYS

DEMOUNTABLE SUPERSTRUCTURE FOR MOTOR CRANES AND THE LIKE

Filed June 30, 1958 2 Sheets-Sheet 2

INVENTORS
ROY H. ZEILMAN
OSWALD VON MEHREN
BY Oberlin & Limbach
ATTORNEYS 2,965,245

DEMOUNTABLE SUPERSTRUCTURE FOR MOTOR CRANES AND THE LIKE

Roy H. Zeilman, Elyria, and Oswald von Mehren, Lorain, Ohio, assignors to The Thew Shovel Company, Lorain, Ohio, a corporation of Ohio Filed June 30, 1958, Ser. No. 745,367

7 Claims. (Cl. 212—69)

The present invention relates generally as indicated to a demountable superstructure for motor cranes and the like, and more particularly, to means for facilitating the demounting and remounting of such superstructures from and onto the carriers therefor.

In equipment of this character there is usually provided a carrier in the form of a multi-axle chassis on the frame of which the turntable is bolted. While such turntable and the superstructure, such as a crane cab and boom assembly, may be removed by unbolting the turntable from the chassis for complying with highway axle load limits and for clearing low bridges and the like, it is quite a difficult and time-consuming task to remount the turntable assembly because the bolt holes in the turntable must be aligned with the bolt holes in the chassis not only from the standpoint of the coincidence of the bolt circle centers but also of the rotary disposition of the turntable.

It is a principal object of this invention to render easy and quick, the demounting and remounting of the turntable from and onto the chassis frame without any necessity of aligning bolt holes in the turntable and in the chassis.

It is another object of this invention to provide a demountable superstructure in which the turntable may be assembled on the chassis in any rotary position.

It is another object of this invention to provide a turntable guiding and clamping structure which serves to accurately laterally guide the movements of the turntable assembly on the chassis frame to proper position and which securely mounts the turntable on the chassis frame at such proper position without necessity of rotary and lateral aligning movements.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
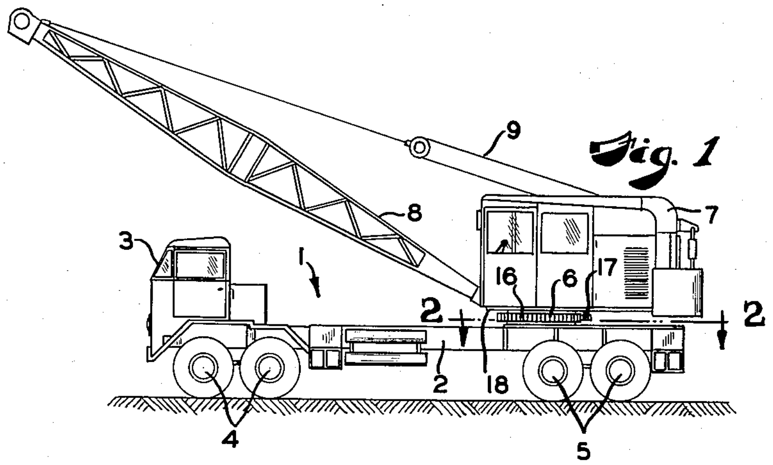
Fig. 1 is a side elevation view of a typical motor crane embodying the present invention.

Referring now more particularly to the drawings, and first to Fig. 1, the reference numeral 1 denotes the carrier which includes the chassis frame 2. In this case, shown by way of example only, the carrier 1 is of the four-axle type and has a driver's cab 3 adjacent the front end and over the front tandem axles 4. Mounted on the frame 2 over the rear tandem axles 5 is a turntable 6 which swingably carries the crane cab 7 and crane boom 8. Within the crane cab 7 will be provided the usual controls (not shown) by which the boom 8 is swung about the vertical axis of the turntable 6 and by which the usual hoisting drums (not shown) are actuated to raise and lower the boom 8 through the conventional cable system 9.

Figure 2:
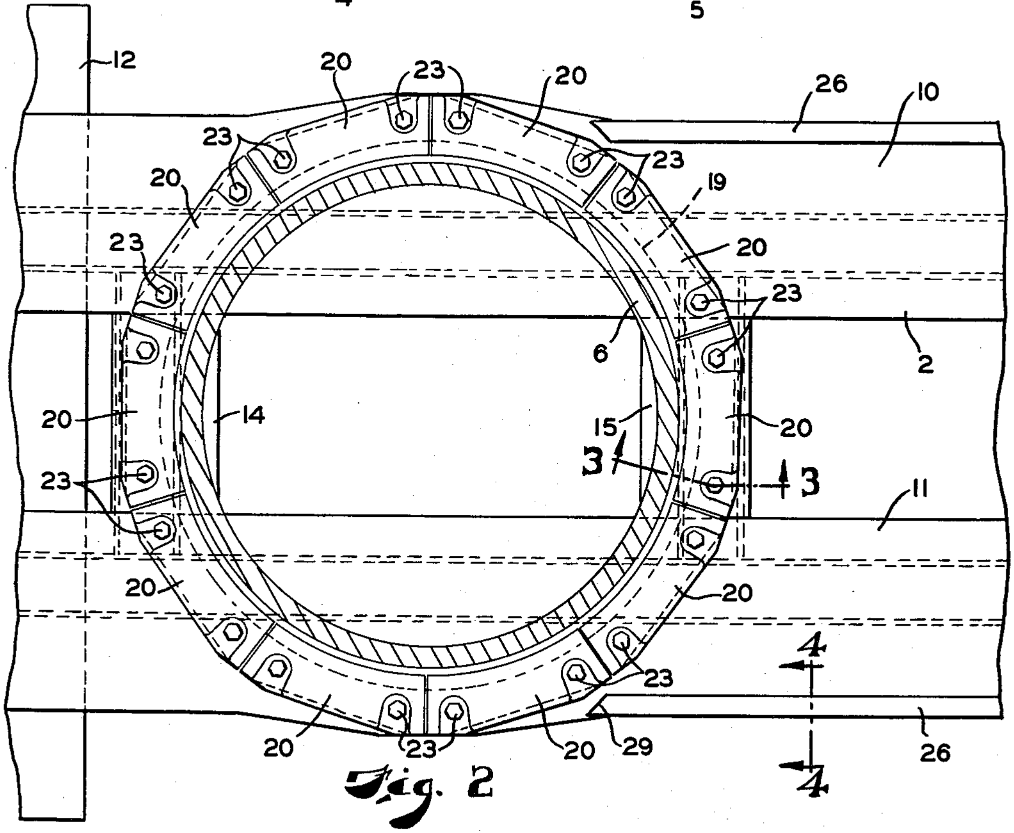
Fig. 2 is a horizontal cross-section view taken substantially along the line 2—2, Fig. 1.

As best shown in Fig. 2, the rear portion of the chassis frame 2 comprises a pair of longitudinally extending members 10 and 11 and the usual cross bars 12, 14, and 15 which define a plane top surface to support the plane annular bottom surface of the turntable 6. In this case, the turntable 6 is formed with peripheral gear teeth 16 with which the drive pinion 17 of the superstructure is meshed for swinging the superstructure (the cab 7 and boom 8) about the vertical axis of the turntable 6. The turntable 6 constitutes the outer race of a ball bearing assembly as disclosed, for example, in the copending application of Roy H. Zeilman, Ser. No. 714,974, filed February 13, 1958, now Patent No. 2,897,021. The floor or base 18 of the superstructure will be firmly secured to the inner race of such ball bearing assembly, thereby to rotatably support the superstructure.

The turntable 6, additionally, is formed with a peripheral flange 19 around the base thereof by which the turntable and superstructure is adapted to be clamped on top of the chassis frame 2.

Figure 3:
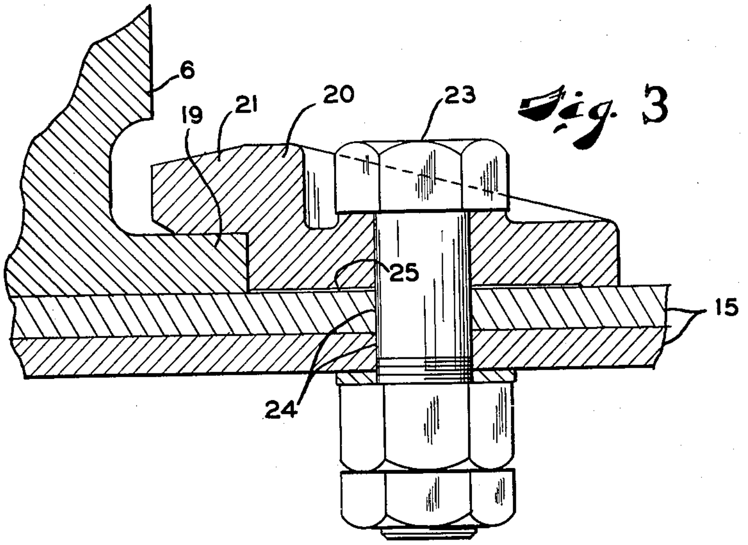
Fig. 3 is a detail cross-section view taken substantially along the line 3—3, Fig. 2.
Figure 4:
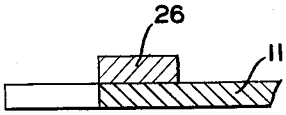
Fig. 4 is a detail cross-section view taken substantially along the line 4—4, Fig. 2; and, Fig. 5 is a fragmentary top plan view with the superstructure removed and with guide bars installed along opposite sides of the chassis frame.

Herein, the clamping of the turntable 6 and superstructure 7, 8 by the flange 19 to the chassis frame 2 is accomplished by an annular series of clamps 20, ten in number, for example, each of which is formed with an inwardly extending arcuate flange 21 that overlies the peripheral flange 19 of the turntable 6. The clamps 20 are removably mounted on the chassis frame 2 as by means of the respective pairs of bolt and nut assemblies 23, the shanks of the bolts passing through a circular series of holes 24 formed in the chassis frame members. The undersides of the respective arcuate clamps 20 are relieved at 25, as best shown in Fig. 3, so that when the bolt and nut assemblies 23 are tightened, the turntable 6 is firmly clamped on the chassis frame 2 and is frictionally held against rotation.

Rearward of the centerline of the turntable 6 and of the annular series of clamps 20, the chassis frame 2 is provided with opposite parallel guide strips 26 which are spaced laterally apart a distance corresponding approximately with the diameter of the peripheral flange 19 of the turnable 6.

Figure 5:
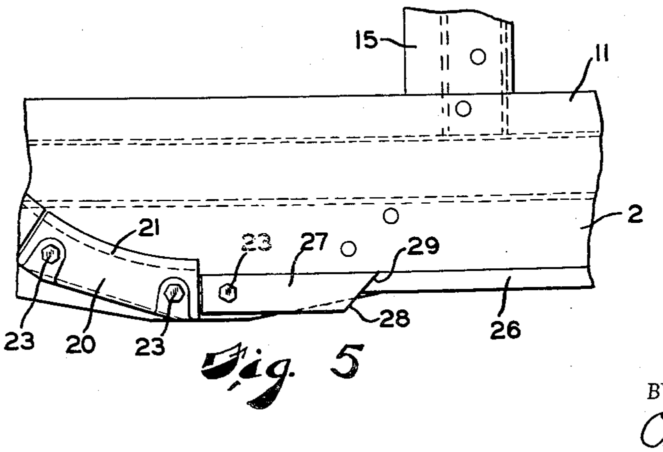

When it is desired to demount the superstructure 7, 8 all that it is necessary to do is to loosen the bolt and nut assemblies 23 of the series of five clamps 20 that are forward or to the left of the centerline of the turntable 6 and to remove the series of five clamps 20 that are to the rear or to the right of the centerline of the turntable 6. Then, short guide bars 27 with beveled ends 28 abutting the beveled front ends 29 of guide strips 26 are installed as by using the bolt and nut assemblies 23 as shown in Fig. 5 to constitute tangential extensions of the semicircular series of loosened clamps 20 and to bridge the gaps to the forward ends of the guide strips 26. Now, the superstructure 7, 8 may be slid to the rear off the frame 2 and shipped separately to the place of use on another carrier that meets highway axle load limits and, of course, the carrier 1, thus relieved of the superstructure 7, 8, may be driven separately to the point of use. Aside from highway load limitations which might require such demounting of the superstructure 7, 8 there may be instances of low bridges or the like, which cannot be cleared by the superstructure 7, 8 as mounted on the carrier 1.

The remounting of the superstructure 7, 8 on the carrier 1 is equally a simple task in that all that it is necessary is to pull the superstructure 7, 8 forwardly on the chassis frame 2 with the flange 19 of the turntable 6 nested between the parallel guide strips 26. The superstructure 7, 8 is thus drawn or pushed forwardly along the chassis frame 2 until the peripheral flange 19 of the turntable 6 is engaged beneath the semi-circular flange defined by flanges 21 of the loosened arcuate clamps 20 which were previously left assembled on the chassis frame 2. It is to be noted that the rotary position of the turntable 6 and of the superstructure 7, 8 is of no concern because there are no bolt holes in the turntable 6 which must be aligned with bolt holes in the chassis frame 2. When the superstructure 7, 8 is in the proper position, the guide bars 27 may be removed and the right-hand series of five clamps 20 are replaced and all of the bolt and nut assemblies 23 are tightened to immovably clamp the superstructure 7, 8 on the chassis frame 2.

Other modes of applying the principle of the invention may be employed, changes being made as regards the details described, provided the features stated in any of the following claims, or the equivalent of such, be employed.

We therefore particularly point out and distinctly claim as our invention:

1. In combination, a carrier comprising a chassis frame having longitudinally extending guides; a superstructure including a circular turntable provided with a peripheral flange slidably guided by said guides for longitudinal movement on said chassis frame; and an annular series of clamps secured to said chassis frame adjacent one end of said guides for clamping said turntable by its flange onto said chassis frame, at least those clamps that are on the same side of the centerline of said turntable as said guides being removable to permit sliding of said superstructure.

2. In combination, a carrier comprising a chassis frame having longitudinally extending guides; a superstructure including a circular turntable provided with a peripheral flange slidably guided by said guides for longitudinal movement on said chassis frame; and an annular series of clamps on said chassis frame each provided with an arcuate inwardly extending flange that overlies the flange of said turntable; means for drawing said clamps down to clamp said turntable on said chassis frame, the clamps on the same side of the centerline of said turntable as said guides being removeable to permit sliding of said superstructure.

3. In combination, a carrier comprising a chassis frame; a pair of upstanding parallel guide strips extending longitudinally of said frame from the rear end toward the front end; a superstructure including a turntable having a peripheral flange of diameter approximately the same as the space between said strips; a semi-circular series of clamps tangent to the front ends of the respective strips and provided with an inturned flange that overlies one half of the flange of said turntable when the latter is slid forwardly on said frame between said strips; another complementary semi-circular series of clamps adapted to be secured on said frame to overlie the remaining one-half of said flange; and means for drawing the clamps of both series down to clamp said turntable on said frame.

4. The combination of claim 3 wherein said last-named means comprises a series of bolt and nut assemblies extending through aligned holes of said clamps and frame.

5. The combination of claim 3 wherein guide bars are secured to extend tangentially between the front ends of said strips and the ends of the first-mentioned series of clamps when said another series of clamps is removed.

6. The combination of claim 5 wherein said guide bars and strips have beveled juxtaposed ends, and wherein a single nut and bolt assembly adjacent the other end of each guide bar secures the same to said frame, the juxtaposed beveled ends preventing swinging outward of said guide bars out of alignment with said strips.

7. In combination, a carrier comprising a chassis frame, a superstructure provided with a peripheral flange seated on said chassis frame, a series of clamps spaced about said superstructure secured to said frame firmly to clamp said peripheral flange to said frame, parallel guides on said frame aligned with the outermost transverse portions of said flange, those clamps in the path of the guideway defined by said guides and the outermost transverse portion of said flange being removable to permit sliding said superstructure between said guides, said clamps being pivoted against said chassis frame and overlying the edge of said peripheral flange, and means for drawing said clamps downwardly to clamp said turntable on said frame.

References Cited in the file of this patent

UNITED STATES PATENTS

| | | |
|---|---|---|
| 2,472,726 | Russell | June 7, 1949 |
| 2,568,905 | Wiehsner | Sept. 25, 1951 |

FOREIGN PATENTS

| | | |
|---|---|---|
| 2,367 | Great Britain | Nov. 15, 1887 |